United States Patent
Franci Rodon et al.

(10) Patent No.: US 12,553,739 B1
(45) Date of Patent: Feb. 17, 2026

(54) SYSTEMS AND METHODS FOR GENERATING MAP DATA

(71) Applicant: Zoox, Inc., Foster City, CA (US)

(72) Inventors: Arnau Franci Rodon, San Francisco, CA (US); Soroush Dean Khadem, San Francisco, CA (US); Till Kroeger, Chicago, IL (US); Weiying Wang, Cambridge, MA (US)

(73) Assignee: Zoox, Inc., Foster City, CA (US)

( * ) Notice: Subject to any disclaimer, the term of this patent is extended or adjusted under 35 U.S.C. 154(b) by 127 days.

(21) Appl. No.: 18/510,480

(22) Filed: Nov. 15, 2023

(51) Int. Cl.
*G01C 21/00* (2006.01)
(52) U.S. Cl.
CPC ................ *G01C 21/3841* (2020.08)
(58) Field of Classification Search
CPC .................................................. G01C 21/3841
See application file for complete search history.

(56) References Cited

U.S. PATENT DOCUMENTS

| | | | |
|---|---|---|---|
| 8,594,923 B2 * | 11/2013 | Wong | G05D 1/0297 701/409 |
| 9,612,123 B1 * | 4/2017 | Levinson | B60Q 1/508 |
| 11,106,218 B2 * | 8/2021 | Levinson | G05D 1/2249 |
| 11,341,844 B2 * | 5/2022 | Lofter | G05D 1/0214 |
| 11,604,465 B2 * | 3/2023 | Liu | G01C 21/3602 |
| 11,899,114 B1 * | 2/2024 | Kroeger | G01S 17/931 |
| 12,209,869 B2 * | 1/2025 | Xu | G01C 21/3807 |
| 2022/0326023 A1 * | 10/2022 | Xu | B60W 60/001 |
| 2024/0094009 A1 * | 3/2024 | Bosse | G01C 21/3848 |

OTHER PUBLICATIONS

Tessier et al, C. A New Landmark and Sensor Selection Method for Vehicle Localization and Guidance, Google Scholar, Proceedings of the 2007 IEEE Intelligent Vehicles Symposium, Jun. 2007, pp. 123-129. (Year: 2007).*

* cited by examiner

*Primary Examiner* — Russell Frejd
(74) *Attorney, Agent, or Firm* — EIP US LLP

(57) ABSTRACT

Techniques are provided comprising receiving first sensor data associated with a first vehicle pose and second sensor data associated with a second vehicle pose. A user input is received via a user interface indicating a position associated with a feature represented in the first sensor data and the second sensor data. Based at least in part on the position associated with the feature, the first vehicle pose, and the second vehicle pose, an alignment between the first sensor data and the second sensor data is determined. Map data is determined based at least in part on the first sensor data, the second sensor data, and the alignment.

18 Claims, 7 Drawing Sheets

SYSTEMS AND METHODS FOR GENERATING MAP DATA

BACKGROUND

Vehicles such as autonomous vehicles may rely on large amounts of environmental and map data to assist with navigation. Map data may be generated based on sensor data collected by vehicles traversing environments. Inaccuracies in such a map may cause a device relying on the map to incorrectly determine a location of the device in the environment, which may inhibit operations performed by the device or even risk the safety of a user of the device or others in the environment.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
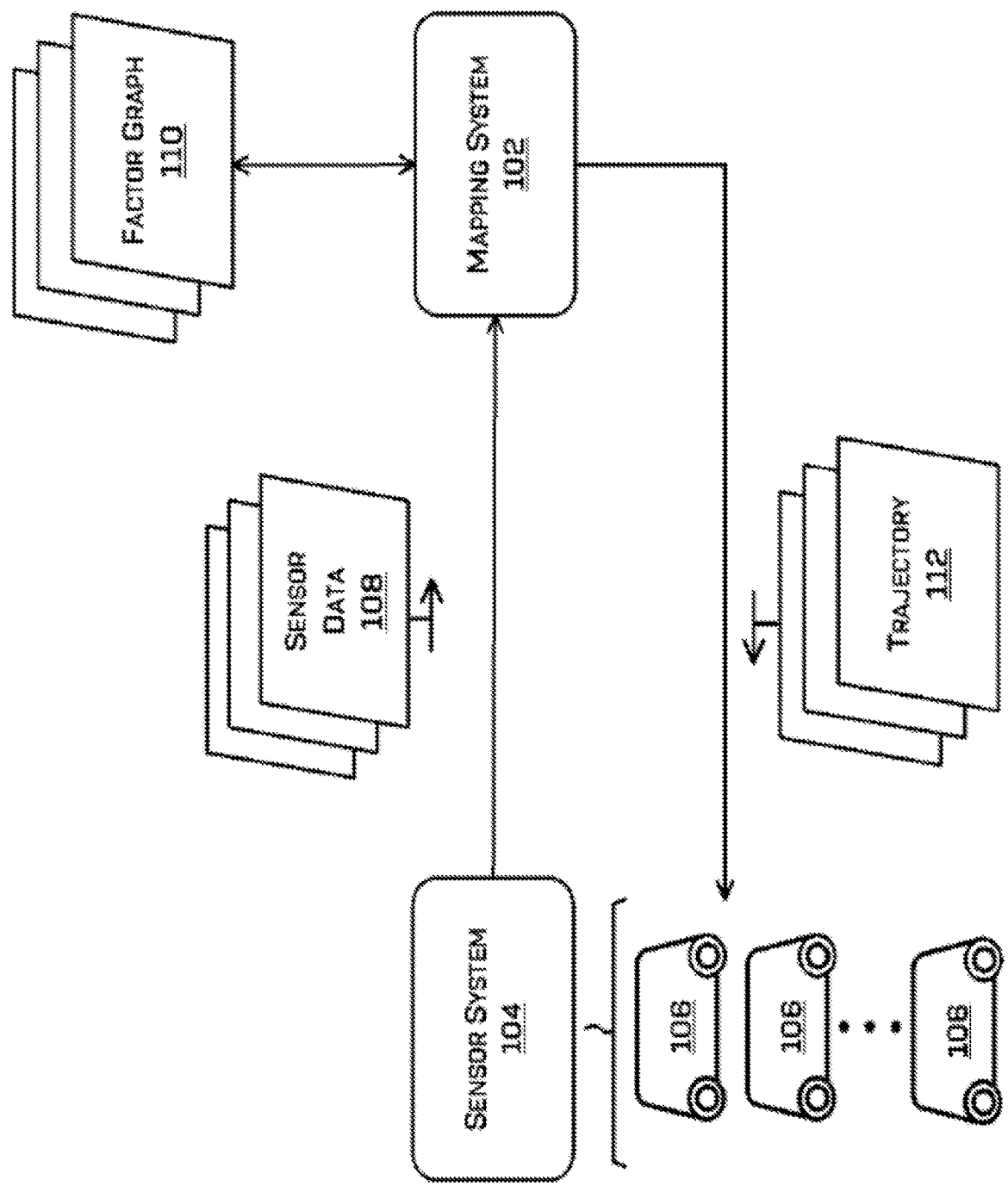
FIG. 1 is a block-diagram illustrating an example architecture of a mapping system associated with a plurality of autonomous vehicles.

Techniques for generating map data based at least in part on sensor data are discussed herein. Map data may be determined based at least in part on sensor data, for example sensor data recording by a vehicle traversing an environment. In non-limiting examples, the sensor data may comprise camera data, radar data, ultrasonic data, lidar data, wheel encoder data, GNSS data, etc. Sensor data may be associated with a vehicle pose (e.g., vehicle position and/or orientation). Sensor data representing a particular environment or location may be recorded at different poses, different times, and/or by different vehicles/sensor systems. In a non-limiting example, first sensor data may represent an environment as captured from a first position. Second sensor data may represent the same environment, but captured from a different, second position. In either case, the first and second data may come from a same vehicle at different times and/or different vehicles regardless of the time. Map data representing the environment may be generated from the combination of the first and second sensor data. To do so, the first sensor data may be aligned to the second sensor data, for example so that features within the environment represented in both the first and second sensor data overlap. Such an alignment may be determined by identifying a landmark in the first and second sensor data, and identifying a transformation that causes the landmark to appear at the same position in the first sensor data, for example based on the respective vehicle poses associated with the first and second sensor data.

In some techniques, landmarks may be automatically identified in sensor data, and map data generated based the sensor data and automatically determined alignments between sensor data. Such techniques may identify landmarks using object detection, identifying landmarks associated with a predetermined set of landmarks (e.g., landmarks or classes of landmarks that can be accurately and repeatably recognized by a machine). Such landmarks may generally be distinctly recognizable features of the environment, such as traffic lights, lamp posts, etc. However, some environments may have relatively few of such landmarks. In these environments, the alignments between sets of sensor data may be less accurate than for other areas, resulting in less accurate map data being generated.

Techniques of the present disclosure may incorporate user input to identify additional landmarks. For example, techniques may comprise receiving first sensor data associated with a first vehicle pose and second sensor data associated with a second vehicle pose. The first and/or second sensor data may be provided to a user interface (e.g., a graphical user interface). A user input may be received, via the user interface, indicating a position associated with a landmark (or other user-identifiable feature) represented in the first sensor data and the second sensor data. The techniques may determine, based at least in part on the position associated with the landmark/feature, the first vehicle pose, and the second vehicle pose, an alignment between the first sensor data and the second sensor data. The techniques may determine map data based at least in part on the first sensor data, the second sensor data, and the alignment. Such techniques may allow a user to identify a landmark/feature that does not belong to a computer-recognizable predetermined set of landmarks. As such, the techniques disclosed herein may allow additional landmarks to be determined, which may increase the accuracy of the alignments between sensor data, and hence improve the accuracy of generated map data.

In some examples, the first vehicle pose and second vehicle pose may be associated with a region of interest. The region of interest may be associated with a relatively low number of landmarks associated with the predetermined set of landmarks (e.g., computer recognizable landmarks). In other regions, associated with higher numbers of landmarks associated with the predetermined set of landmarks, the sensor data may be automatically processed without any user intervention. As landmarks may be used to automatically align poses and sensor data recorded within map data, a region with lower numbers of landmarks may be associated with a lower confidence in the map data, and/or associated with fewer constraints on map data in that region. Thus, user input may be sought to identify further features to further constrain such low-confidence regions On the other hand, user input may not be sought for the higher-confidence regions. Such an approach may reduce the chance of identifying such large numbers of landmarks that the problem of determining alignments based on all the landmarks becomes computationally intensive, or even impossible. In some examples, initial map data may be received. For example, the initial map data may be generated based at least in part on automatically identifying landmarks associated with sensor data. A confidence metric may be determined for a first region represented in the map data. The confidence metric may be representative of the accuracy of the map data. If the confidence metric is below a threshold confidence, the first region may be identified as a region of interest, and may be provided to the user interface. The threshold confidence may be a predetermined value, for example determined based at least in part on an average confidence associated with existing map data.

In some examples, the user-identified landmark or feature may comprise one or more of: a building, a structure, an item of street furniture, or a feature of a road surface, or an aspect of any thereof. For example, the position associated with the landmark/feature may be a particular position on a building or structure, such as a corner of a building. The feature may in general be any element recognizable by the user as represented in at least first sensor data and second sensor data (e.g., represented in a first image and a second image). Such landmarks may be both expected to remain at a fixed position for an extended period of time, and be relatively difficult for a computer to automatically and reliably distinguish from other positions in the environment, such as nearby buildings. As used herein, a landmark may be a three-dimensional (3D) point or object present in the real world and represented within sensor data.

In some examples, the sensor data provided to the user interface may be selected to increase the information content added to the map data. For example, sets of sensor data that are likely to provide different views of the same area may be selected. Accordingly, in some examples the first vehicle pose associated with the first sensor data, and the second vehicle pose associated with the second sensor data may be separated by a distance greater than a threshold distance. Alternatively or additionally, the first sensor data may be associated with a first time, and the second sensor data may be associated with a second time, where the second time is at least a threshold time period after the first time. For example, the second sensor data may be recorded on a different day, different time of day, or different part of the year than the first sensor data. Alternatively or additionally, the first sensor data may be associated with a different sensor system than the second sensor data, for example different sensor systems of the same vehicle (e.g., different cameras, but with the same modality). Alternatively or additionally, the first sensor data may be associated with a different vehicle than the second sensor data. In some examples, a next-best-view algorithm may be used to select sensor data. For example, first sensor data from a region of interest (e.g. a low confidence area identified during optimization of map data based solely on machine recognized landmarks) may be selected, e.g., at random from the available sensor data associated with that region. A next-best-view algorithm may then be run to identify one or more additional sets of sensor data associated with the same region of interest.

Some examples may comprise determining, based at least in part on the user input, an uncertainty associated with the position associated with the landmark. The map data may be determined based at least in part on the uncertainty. In a non-limiting example, the uncertainty may be implemented as a weighting, reducing the impact of alignments determined based on the user input on the ultimately generated map data. Such uncertainties may incorporate a user's inability to precisely select a particular landmark (e.g., eyesight, finger slips, or the like may cause the user to select a position in image data, for example, several pixels away from an intended pixel indicating a corner of a building).

Alternatively or additionally, some examples may comprise displaying, on the user interface, an indication of the uncertainty. A further user input may be received via the user interface, indicating the position associated with the landmark. The further user input may be received on a representation of the same sensor data as the original user input, or on a representation of different sensor data, presented on the user interface. The uncertainty associated with the position associated with the landmark may be updated based at least in part on the further user input. In a non-limiting example, first and second user inputs may be received on representations of the first sensor data and second sensor data respectively. Projections of the positions indicated by the first and second user input in 3D space (e.g., rays) may be determined. A closest position to the two projections may be determined in 3D space. This closest position may be deemed to be the position of the landmark/feature selected by the user. An error associated with this position, e.g., based on the closest distance between the rays, may also be determined. In some such examples, a reprojection of the deemed position of the landmark/feature in the frame of the representation of the first sensor data and/or second sensor data may be presented on the user interface, for example displayed on the respective representation of the first sensor data or second sensor data. A projection of the determined error may also be presented on the representation of the first or second sensor data. Thus, the user may quickly see what the computer has deemed to be the selected landmark/feature, and how large the error associated with the user inputs is. Such examples may provide feedback to the user of the amount of uncertainty in the selected position, and may guide the user in providing further user input to improve the accuracy of the selected position, and hence ultimately the accuracy of the map data. Similarly, in some examples, input may be requested from one or more additional users and the plurality of selections and associated uncertainties may be combined (for example, using Bayesian analysis) to determine an aggregate position and/or uncertainty.

In some examples, the user may freely select the landmark/feature based on a representation of the sensor data presented in the user interface. In other examples, the techniques may comprise presenting, on the user interface, a representation of the first sensor data and an indication of a suggested position associated with a suggested landmark represented in the first sensor data and the second sensor data. In such cases, the user input may indicate acceptance of the suggested position as the position associated with the landmark. In other examples, the system may determine an overlapping area between representations of the first sensor data and the second sensor data, and may display a representation of the overlapping area on the user interface. In some examples, the system may only allow, or may only process, user inputs selected within the overlapping area. Such examples may guide the user in selecting features that appear in both the first and second sensor data.

Some examples may comprise verifying that user input received on multiple sets of sensor data is associated with the same landmark (or same position associated with the landmark). For example, the techniques may use object classification/detection algorithms and/or pattern recognition to verify that the positions indicating by the user input represent approximately the same position in the real-world.

Some examples may comprise providing the map data to a vehicle for controlling a vehicle based at least in part on the generated map data. For example map data may be transmitted to the vehicle via a wireless connection. The vehicle may then be controlled to navigate through an environment based at least in part on the received map data. For example, the map data may be used by a localization system of the computer system(s) of the vehicle to localize the vehicle (e.g., determine the vehicle's pose).

Some techniques may comprise receiving first sensor data associated with a first vehicle pose and second sensor data associated with a second vehicle pose; identifying a first landmark in the first sensor data and in the second sensor data (i.e., a computer recognizable landmark); determining, based at least in part on the first landmark, the first vehicle pose, and the second vehicle pose, a first alignment between the first sensor data and the second sensor data; providing, based at least in part on the first alignment, representations (e.g. respective images) of the first sensor data and the second sensor data to a user interface; receiving, via the user interface, a user input indicating a position associated with a user-selected feature represented in the first sensor data and in the second sensor data; determining, based at least in part on the position associated with the user-selected feature, the first vehicle pose, and the second vehicle pose, a second alignment between the first sensor data and the second sensor data; determining map data based at least in part on the first sensor data, the second sensor data, and the second alignment; and transmitting the map data to a vehicle to configured to be controlled based at least in part on the map data. For example, the first and second sensor may be provided to the user interface based at least in a confidence metric associated with the first alignment (e.g., if the confidence metric indicates a low confidence in the first alignment, and/or associated with poses determined based on the first alignment, the first and second sensor data may be provided to the user interface). The system may automatically determine that the first and second sensor data should be provided to the user interface, for example requesting user input from a user. In other examples, a user may instruct the system to present the first and second sensor data on the user interface.

Some techniques may comprise receiving first sensor data associated with a first vehicle pose and second sensor data associated with a second vehicle pose, the first sensor data and the second sensor data associated with a first geographical region; identifying a first landmark in the first sensor data and the second sensor data, the first landmark associated with a predetermined set of landmarks (e.g., computer recognizable landmarks); determining, based at least in part on the first vehicle pose, the second vehicle pose, and on a position associated with the first landmark, a first alignment between the first sensor data and the second sensor data; receiving third sensor data associated with a third vehicle pose and fourth sensor data associated with a fourth vehicle pose, the third sensor data and fourth sensor data associated with a second geographical region; providing, based at least in part on the third sensor data and fourth sensor data being associated with the second geographical region, the second senor data to a user interface; receiving, via the user interface, a user input indicating a position associated with a user-selected feature represented in the third sensor data and the fourth sensor data; determining, based at least in part on the third vehicle pose, the fourth vehicle pose, and on the position associated with the user-selected feature, a second alignment between the third sensor data and the fourth sensor data; and determining map data based at least in part on the first sensor data, the second sensor data, the third sensor data, the fourth sensor data, the first alignment and the second alignment. As above, the third sensor data and the fourth sensor data may be first processed to (attempt to) identify one or more computer-recognizable landmarks, and may be provided to the user interface based on a confidence in an alignment generated based at least in part on such landmarks. A low confidence in computer-determined alignments may be caused by lack of computer-recognizable landmarks in a particular area, e.g., in the second geographical area above.

Techniques of the present disclosure may improve the functioning of a computer configured to generate map data. For example, techniques of the present disclosure provide an efficient division of workload between the computer and a human operator. The computer may efficiently and effectively generate map data for particular map areas, but in other areas user input may be incorporated to reduce the computational cost of identifying additional landmarks that may be more difficult to automatically identify. Adding the user-identified landmarks only for landmark-sparse geographical areas may prevent adding too many constraints to the alignment optimization problem, also reducing computational burden. Further, techniques of the present disclosure may improve safety of a vehicle, in particular an autonomous or semi-autonomous vehicle. Such vehicles may rely on accurate map data to move safely and efficiently through the environment. The techniques disclosed herein may improve the accuracy of map data as discussed above, and thus may provide vehicles with more accurate data with which to safely navigate the environment.

FIG. 1 is an example block-diagram illustrating an example architecture 100 of a mapping system 102 associated with a plurality of autonomous vehicles, in accordance with implementations of the disclosure. In the illustrated example, sensor systems 104 associated with one or more autonomous vehicles 106 may capture and send sensor data 108 (e.g., environmental data, vehicle pose data, and the like) to the mapping system 102. The mapping system 102 may also store map data as one or more factor graphs 110 representative of one or more environments. The factor graph 110 may include a plurality of nodes that represent the sensor data 108 at one or more particular moments (e.g., a vehicle pose, at a specific time, at a specific pose, etc.). In some examples, the vehicle may estimate the pose using a Bayesian filter (such as a Kalman filter), bundle adjustment, maximum a posteriori estimation (MAP), and/or SLAM algorithm. In some cases, individual nodes of the factor graph 110 may be connected based on a shared trajectory. Alternatively or additionally, nodes of the factor graph 110 may be based on one or more environmental or sensor data link. In particular, nodes may be linked based at least in part on shared landmarks (or other static objects) represented in the sensor data. To generate map data, the mapping system 102 may apply one or more link evaluation techniques to generate links between nodes. In some cases, the mapping system 102 may also apply one or more pose graph optimization techniques to resolve or combine nodes to reduce the overall size of the factor graph 110 and maintain a sparse representation.

In the current example, the factor graph 110 may be used to link sensor data (and/or representations thereof-meshes, features, keypoints, etc.) and/or the most recently generated representation of the environment. In some cases, the factor graph 110 and/or a trajectory 112 or other type of navigation product may be determined by the mapping system 102 using the factor graph 110 and provided back to the vehicles 106.

Further details of generating map data, such as a factor graph, based on aligning sensor data may be found in U.S. Pat. No. 11,657,719, which is incorporated herein by reference in its entirety for all purposes.

Figure 2A:
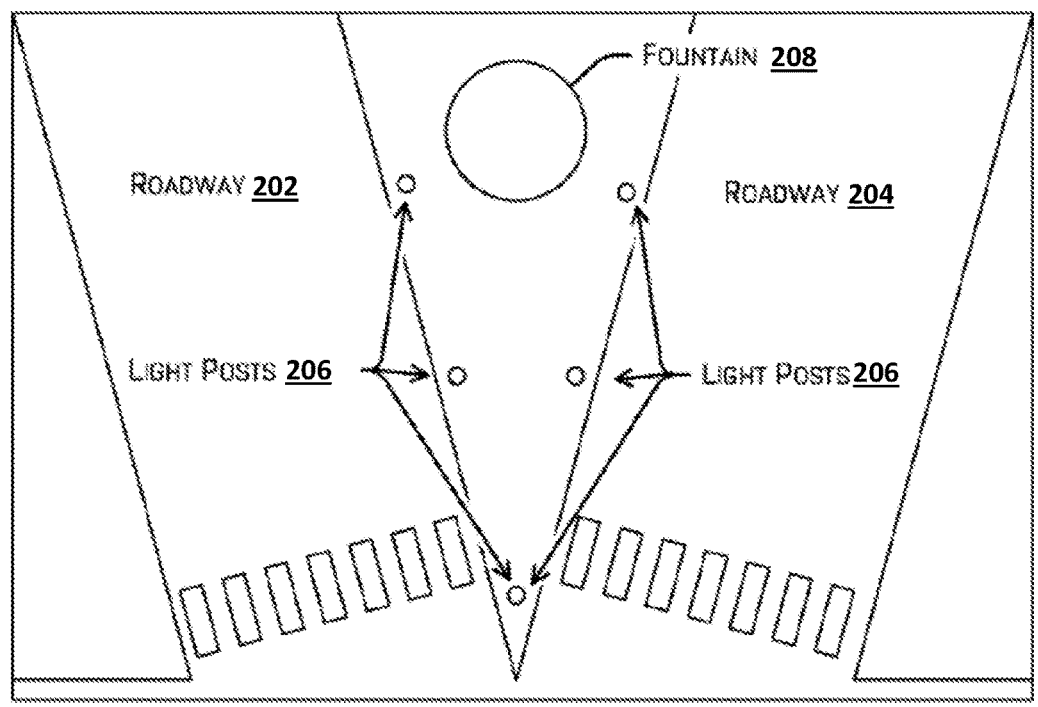
FIG. 2A illustrates an example top-down representation of an environment.
Figure 2B:
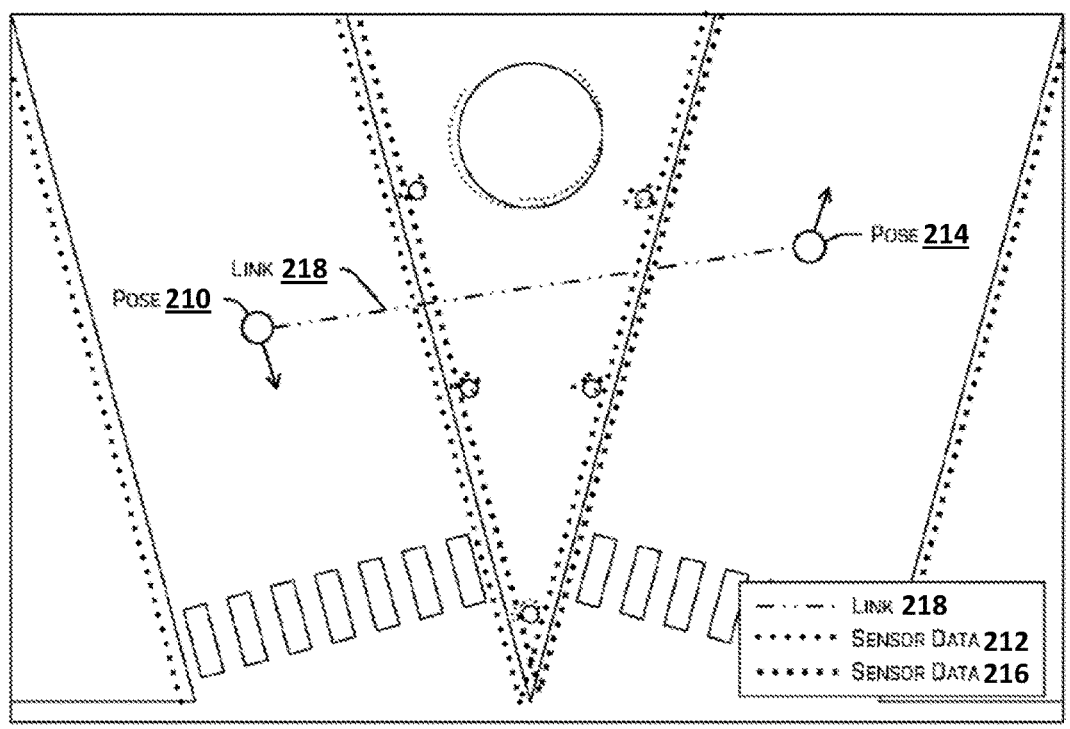
FIG. 2B illustrates two sets of sensor data associated with two different poses, a link between the poses, and an example sensor data alignment.

FIGS. 2A and 2B illustrate how sensor data may be linked to generate map data in a geographical region with large numbers of landmarks from a predetermined set of landmarks (e.g., landmarks which are relatively easy for a computer to detect). FIG. 2A illustrates an example top-down representation of an environment 200. The example environment 200 includes two roadways (202 and 204, respectively), multiple light posts 206, and the base of a fountain 208. In the illustrated example, the light posts 206 and/or the fountain 208 may be considered landmarks in the environment 200, i.e., static features of the environment 200. The light posts 206 and/or the fountain 208 may be part of a set of predetermined landmarks which can be automatically detected. In general, however, the landmarks may be any element of the sensor data (e.g. of an image of the sensor data) recognizable by computer vision techniques, and in particular recognizable by computer vision techniques in at least first sensor data and second sensor data.

FIG. 2B illustrates data that may be part of log data generated by an autonomous and/or mapping vehicle. In the illustrated example, the log data is overlaid a representation of the environment 200 for reference and the representation of environment 200 is represented in gray lines. In some examples, the log data may comprise log data received from one or more autonomous and/or mapping vehicles. The log data may include, for example, at least a first vehicle pose 210 (e.g., an estimated position and/or orientation of the vehicle) associated with first sensor data 212, both of which may have been generated by a first vehicle as it traversed environment 200. The log data may additionally or alternatively include a second vehicle pose 214 associated with second sensor data 216, both of which may have been generated by a first vehicle or a second vehicle as the first vehicle or second vehicle traversed environment 200. The first sensor data 212 and/or second sensor data 216 may represent lidar data, camera data, depth camera data, and/or the like. In some examples, first vehicle pose 210 and/or second vehicle pose 214 maybe part of a trajectory generated by a vehicle.

The log data may be transmitted to a computing device, such as computing device(s) 734 discussed below, or mapping system 102 discussed above (which itself may be implemented on computer device(s) 734). The computer device may determine a link 218 between pose 210 and pose 214 based at least in part on one or more global parameters of a SLAM, loop closures, and/or other mapping algorithm for determining a likelihood that sensor data associated with two different poses likely includes a common view of the environment (e.g., at least a portion of the two sets of sensor data corresponds with a same portion of the environment and/or a different perspective of a same portion of the environment). In particular, the computer device may recognize the landmarks in the environment 300 as represented in the first sensor data 212 and second sensor data 216. For example, the computer device may apply a feature descriptor algorithm to determine numerical representations of the landmark in the first sensor data and the second sensor data, and determine based at least in part on a similarity between these representations that the landmark in the two sets of sensor data is the same. The computer device may utilize the position of the same landmark(s) in sensor data 212, 216 to determine the link 218 between the first sensor data 212 and the second sensor data 216.

The computer device may determine an alignment of the first sensor data 212 to the second sensor data 216 based at least in part on the link. For example, determining the alignment may be based at least in part on the existence of the proposed link between a first pose and a second pose. Similarly, links may be formed between additional poses. Each pose may form a node of a pose node graph. The node graph may be optimized by reducing a measure of error by moving the poses of the nodes while constrained by the links. In some examples, the error may comprise a total residual between respective data points of the first sensor data and the second sensor data. In other words, the error may be an indication of how far off the first sensor data is from being aligned with the second sensor data (and similarly for additional nodes of the pose graph network). The output may be the best estimate of the positions and orientations of the vehicles capturing the sensor data while they traversed the environment. Once the best estimate is found, the sensor data associated with each pose may be used to create a mesh, which may be or form the map data. The map data may subsequently be sent to vehicles, for example for use in onboard localization of the vehicles during vehicle operations.

As will be appreciated, further sensor data may be collected and may be similarly linked to the first sensor data 212 and/or second sensor data 216 to build up map data such as a factor graph 110.

In environments such as environment 200, having a large number of computer-recognizable landmarks, the map data resulting from generating links and alignments based on common positions of landmarks in sensor data may be relatively accurate. However, in other environments, in where there are fewer or no computer-recognizable landmarks, the map data generated may be less reliable. For example, an alignment between first sensor data and second sensor data in such an environment may be less accurate due to the lack of common detected reference points represented in the collected sensor data.

Figure 3:
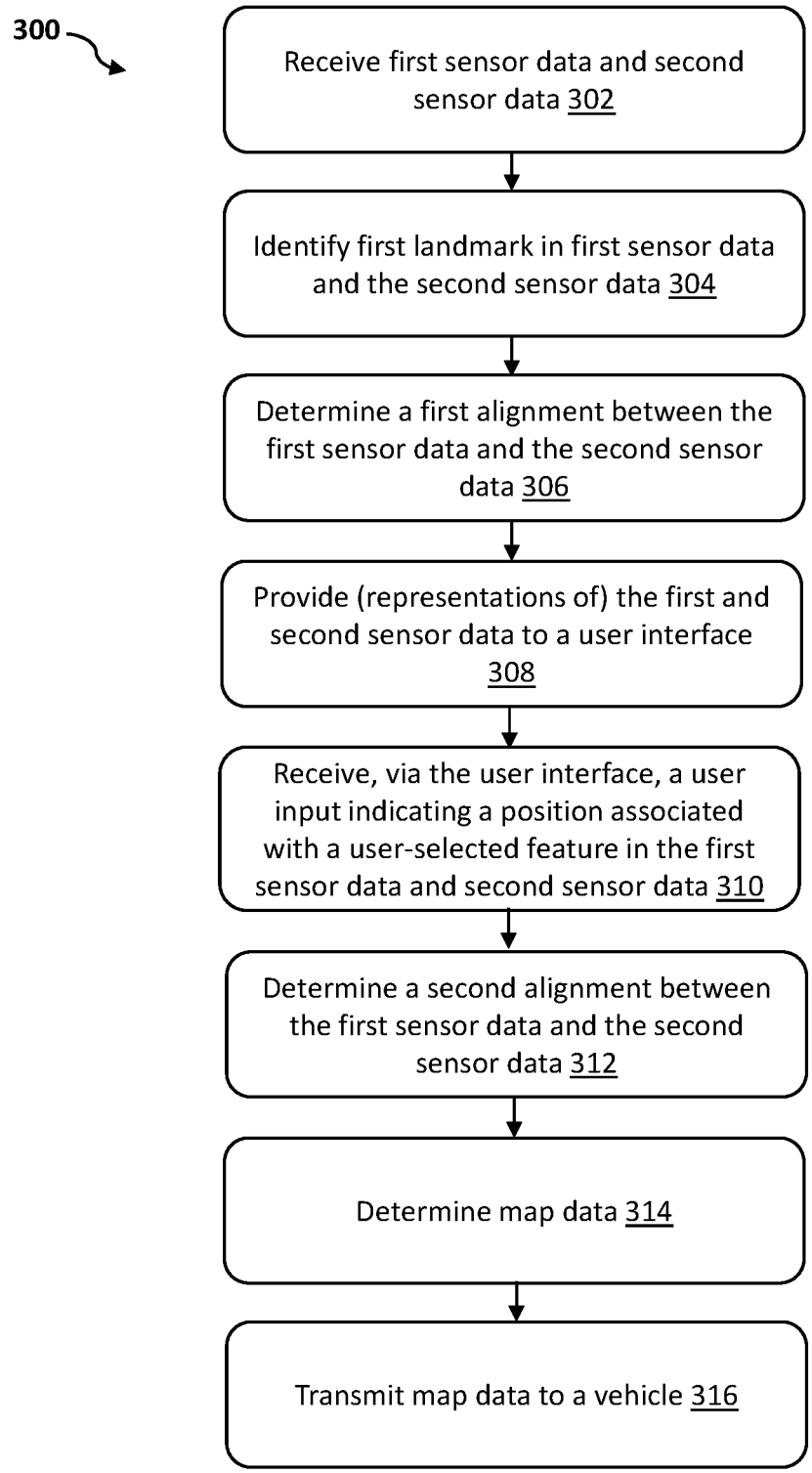
FIG. 3 schematically illustrates a process according to techniques of the present disclosure.

FIG. 3 illustrates a process 300 according to the present disclosure. Process 300 may be implemented on a computer device, such as computer device(s) 734. Process 300 may be implemented on a system comprising one or more processors and one or more non-transitory computer-readable media storing instructions that, when executed, perform the operations of process 300. Process 300 may be implemented as one or more transitory or non-transitory computer-readable media storing instructions executable by one or more processors, wherein the instructions, when executed, cause the one or more processors to perform the operations of process 300. Process 300 may be implemented as a computer program comprising instructions which, when executed by a computer device, cause the computer device to perform the operations of process 300.

As illustrated, process 300 may comprise receiving and processing first and second sensor data in two distinct ways: first by (attempting to) recognize landmarks in or associated with the first and second sensor data automatically, e.g., using computer vision algorithms (similarly to the techniques discussed in relation to FIG. 2); and second by receiving user input. This two-step approach may be used where confidence in the alignment(s) determined by the computer alone is low. In particular, this may occur for geographical areas region in which there are relatively few numbers of computer recognizable landmarks, i.e., landmarks associated with, or belonging to, a predetermined set of landmarks (or landmark classes).

Operation 302 may comprise receiving first sensor data associated with a first vehicle pose and second sensor data associated with a second vehicle pose For example, first sensor data and second sensor data may be received from a vehicle (or respective vehicles) such as vehicle 106 discussed above.

Operation 304 may comprise, for example by the computer device, identifying a first landmark in the first sensor data and in the second sensor data (i.e., identifying a position associated with the same first landmark in both sets of sensor data). The first landmark may be associated with a predetermined set of landmarks or landmark classes. For example, the landmark may be a light post 206 as in FIG. 2A. In general, however, the landmark may be any landmark recognizable by the computer.

Operation 306 may comprise determining, based at least in part on the first vehicle pose, the second vehicle pose, and a position associated with the first landmark, a first alignment between the first sensor data and the second sensor. For example, the position may be a position of the landmark, or otherwise associated with the landmark (e.g., where the landmark is a distinct object, the position may be the base of the first landmark, or at a center of the first landmark, or at another position on the first landmark. Determining a first alignment between the first sensor data and the second sensor data may comprise determining a link between the first vehicle pose and the second vehicle pose, and optionally with poses associated with additional sensor data, for example additional sensor data and vehicle poses already incorporated into map data (e.g., a factor graph 110).

Operation 308 may comprise providing, based at least in part on the first alignment between the first sensor data and the second sensor data, the first sensor data and the second senor data (or representations thereof, e.g. one or more images from each set of sensor data) to a user interface. The user interface may be a user interface presented on a display apparatus (e.g., a computer monitor or tablet computer) associated with the user. For example, process 300 may comprise determining that the a confidence associated with the first alignment is below a confidence threshold, and/or determining that a number of constraints associated with the first alignment is below a constraint threshold. Based on this determination, the process 300 may seek user input by providing the second sensor data to a user interface. In alternative examples, a user may indicate, based at least in part on the first alignment or a confidence metric determined based at least in part on the first alignment, that the first sensor data and second sensor data should be provided to the user interface.

The user interface may output representations of the first sensor data and the second sensor data to a user, such as a technician. The representations may provide a visualization of the environment represented in the first sensor data and the second sensor data. The user interface may output respective elements of the first sensor and the second sensor data, such as respective camera images. The user interface may be presented on a user interface device. The user interface device may be or comprise a display apparatus for presenting the user interface. The user interface device may comprise a standalone display apparatus, such as a computer monitor connected to a computer device. The user interface device may comprise an integral display, such as a laptop computer or tablet computer. The user interface device may be part of, or otherwise associated with, the computer device(s) on which process 300 is performed.

In some examples, the user interface device may be or comprise a touch screen. A user may interact with the user interface using one or more touch inputs. Additionally, or alternatively, the user may use an input device to interact with the user interface. In examples, the input device may include one or more of a touch-sensitive screen, a stylus, a mouse, a dial, a keypad, and/or a gesture-input system configured to translate gestures performed by the user into input commands for the user interface. Further alternatively or additionally, the user may interact with the user interface using voice input.

Figure 4:
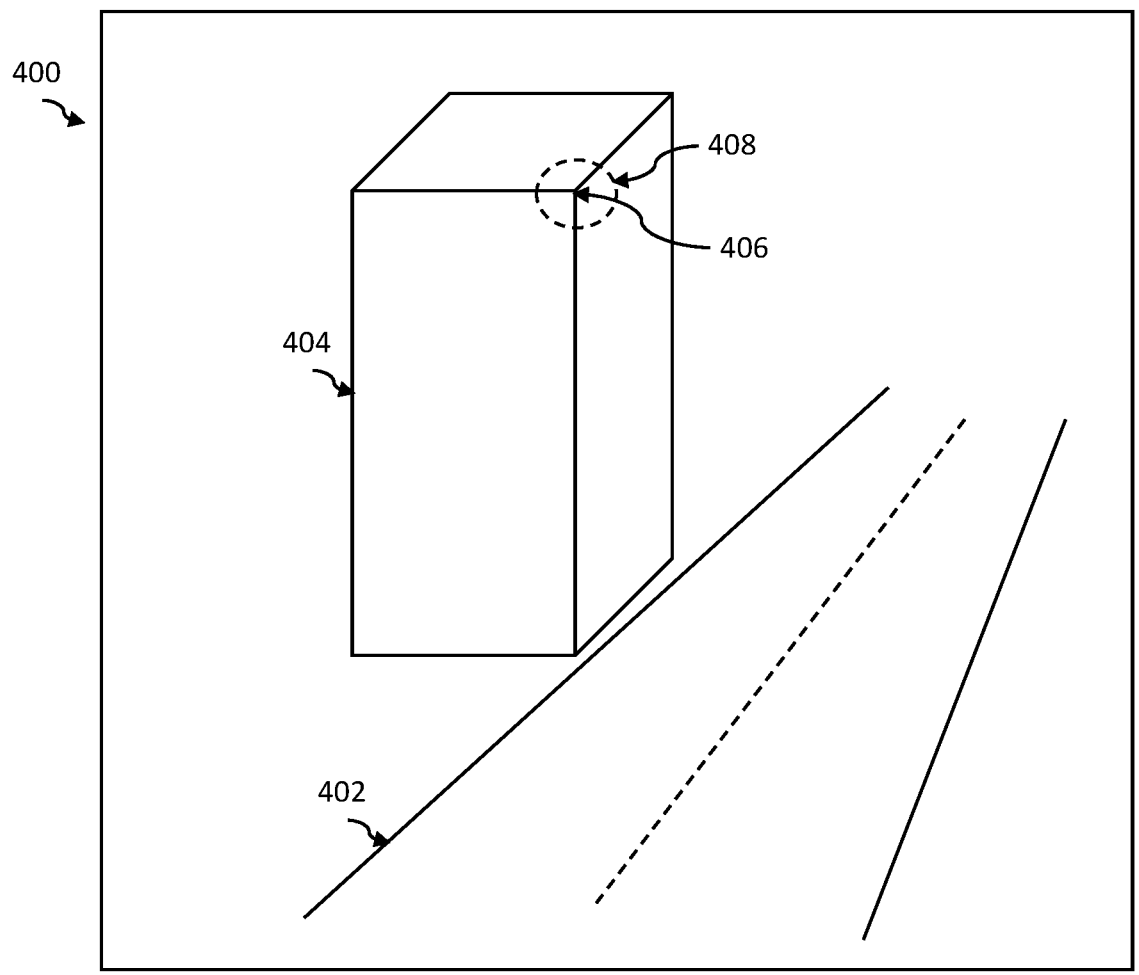
FIG. 4 illustrates a user interface displaying a representation of sensor data.

FIG. 4 illustrates an example user interface 400 that may be presented to a user in operation 310. User interface 400 presents a representation of the a geographical region as captured in the first and/or second sensor data. For example, user interface 400 may present a camera image of an environment around the vehicle capturing the second sensor data (e.g., ahead of, to the side, or behind the vehicle). In this example, the part of the geographical region represented in the sensor data is relatively sparsely populated, for example comprising a roadway 402 and a building 404. In this example a building such as building 404 may not be part of the predetermined (computer-recognizable) set of landmarks, and so the process 300 may not automatically identify many (or any) landmarks in the first and second sensor data. A human user, however, may recognize that the building 404 may be used as a landmark/feature for relating the positions of sensor data captured in this area. Accordingly, the user may provide input selecting a position 406 associated with the building 404. In this example, the position 406 is a corner of the building 404. The user may provide input selecting (approximately) the same position on a representation of the first sensor data and a representation of the second sensor data.

As will be appreciated, there can be an uncertainty as to the position on a user interface that a user intended to select. For the mapping purposes discussed herein, it may be preferable to reduce the uncertainty in the user indicated position, so that a more precise location can be used to relate sensor data to one another based on the position. Accordingly, in some examples, the user interface may present an indication of the uncertainty 408 associated with the position 406. The uncertainty 408 may be based on the uncertainty of a position of a user input on the currently displayed sensor data. Alternatively, where representations of multiple sensor data associated with the second geographical region are presented sequentially to the user and the user indicates (approximately) the same position 406 on the multiple representations, the uncertainty 408 may indicate the combined uncertainty in the position 406 based on multiple user inputs. For example, the uncertainty 408 may represent a covariance. The uncertainty 408 in position 406 may be uniform in all positions, and thus uncertainty 408 may appear as a circle. Alternatively, it may be determined the user input aligns with a feature of the landmark, such as an edge of the building 404 in user interface 400. In such cases, the system may determine that intended position 406 was likely on the feature of the landmark, and so may constrain the uncertainty 408 based on the location of the feature. After presenting the uncertainty 408, in some examples a further user input may be received, which may be used to refine the determined position 406. Thus, a user may be guided to interact further with the user interface to improve the precision of the selected position.

In some examples, uncertainty in the position selected by the user may be incorporated into the links and/or map data generated based on the user input. For example, uncertainty may be applied as a weight in the factor graph, reducing the weight given to a particular position in aligning sensor data where the uncertainty in the position is greater.

Returning to process 300, process 300 may comprise operation 310, at which a user input may be received, as discussed above. The user input may indicate a position associated with a user-selected feature (or landmark) represented in the first sensor data and in the second sensor data, such as position 406 associated with building 404 in user interface 400. Although described here with the example of a building 404, the user-selected feature may be any feature of the environment or any element of the representations of the sensor data presented to the user, so long as the same element is recognizable in both representations. In particular, the user-selected feature may be a feature of the environment which may be expected to be permanent or semi-permanent, so that data recorded in the future may also use be aligned based on the same landmark. For example, the user-selected feature may be a building or other structure (e.g., a billboard). The user-selected feature may be an item of street furniture, such as a bench, sign, or traffic light. The user-selected feature may be a feature of a road surface, such as a crack in the road surface. The user-selected feature may be any aspect of such features, such as a particular point on said features.

Process 300 may comprise operation 314. Operation 314 may comprise determining, based at least in part on the first vehicle pose, the second vehicle pose and on the position associated with the user-selected feature, a second alignment between the first sensor data and second sensor data. Operation 314 may be substantially similar to operation 306 as performed based purely on computer-recognized landmarks. However, in this case the second alignment is determined based on the position(s) selected by the user, rather than based on an automatically identified landmark.

Process 300 may comprise operation 314. Operation 314 may comprise determining map data based at least in part on the first sensor data, the second sensor data, and the second alignment between the first sensor data and the second sensor data. The map data may be or comprise a mesh generated based at least in part on a pose factor graph, the pose factor graph generated based at least in part on the first vehicle pose, the second vehicle pose, and the second alignment (e.g., via an optimization process as discussed above). The map data may be stored, for example in a memory associated with the computer device performing the operation 300. The map data, or part thereof, may be transmitted to one or more vehicles. Each vehicle may comprise a control system which controls the vehicle to navigate through an environment based at least in part on the received map data.

In some examples, process 300 may further comprise operation 316. Operation 316 may comprise transmitting the map data to a vehicle, such as vehicle 106. The vehicle may then be controlled based at least in part on the map data. For example, the map data may be used by a localization component of the vehicle to localize the vehicle in an environment, and so aid in determining, e.g., by a planning component of the vehicle, how to navigate the vehicle through the environment.

Figure 5:
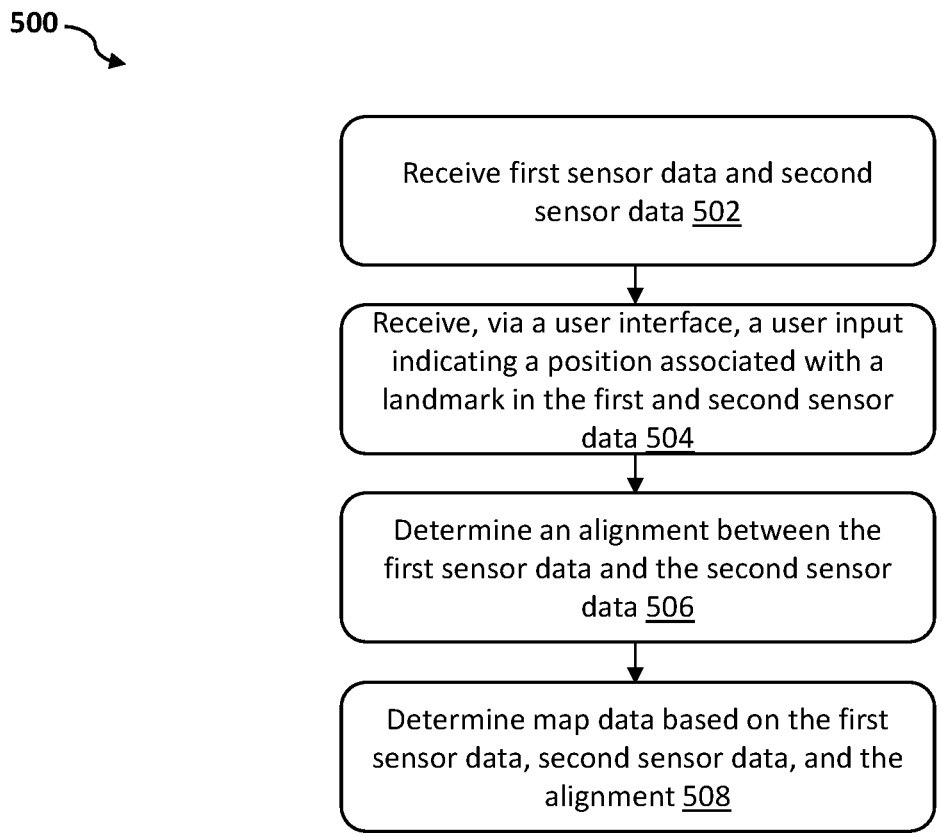
FIG. 5 schematically illustrates a further process according to techniques of the present disclosure.

FIG. 5 illustrates a process 500 according to the present disclosure. Process 500 may be implemented on a computer device, such as computer device(s) 734. Process 500 may be implemented on a system comprising one or more processors and one or more non-transitory computer-readable media storing instructions that, when executed, perform the operations of process 500. Process 500 may be implemented as one or more transitory or non-transitory computer-readable media storing instructions executable by one or more processors, wherein the instructions, when executed, cause the one or more processors to perform the operations of process 500. Process 500 may be implemented as a computer program comprising instructions which, when executed by a computer device, cause the computer device to perform the operations of process 500.

Process 500 may comprise operation 502. Operation 502 may comprise receiving first sensor data associated with a first vehicle pose and second sensor data associated with a second vehicle pose. Receiving the first sensor data and second sensor data may be substantially similar to receiving sensor data as described in relation to operations 302 and 308 above. In particular, first and second sensor data may be received from one or more vehicle, such as vehicle 106, traversing an environment (whether at a similar time, or different times). First and second sensor data may be associated with the same geographical region, such as a region of interest as discussed in relation to FIG. 6. The first sensor data and/or the second sensor data may be provided to a user interface, similarly to operation 310 discussed above.

Process 500 may comprise operation 504. Operation 504 may comprise receiving, via a user interface, a user input indicating a position associated with a landmark represented in the first sensor data and the second sensor data. For example, the first sensor data (or a representation thereof) may first be presented on the user interface. The user may identify a position associated with a landmark, such as a building 404 as in user interface 400 discussed above. The second sensor data (or a representation thereof) may then be presented in the user interface. The user may identify the same position associated with the same landmark, now as found in the representation of the second sensor data. Thus the user may provide the system with a landmark common to the first sensor data and second sensor data which can be used to link the first sensor data to the second sensor data (and any other sensor data in which the landmark is represented).

In some examples, the first sensor data and second sensor data may be selected from available sensor data associated with the second geographical region. For example, it may be inefficient for a user to process all the available sensor data, and so a subset of available data may be presented to the user. In some examples, the first sensor data and/or second sensor data may be selected based on an information content of the data. For example, the second sensor data may be selected based on the amount of information added compared to the first sensor data, or compared to existing map data. Some examples may comprise performing an information-maximizing algorithm, such as a next-best-view algorithm, to select sensor data based on the information content of the sensor data (e.g., based on camera images in the sensor data). Alternatively or additionally, the first and/or second sensor data may be selected based on characteristics which may increase the information added, for example by ensuring differences between the first sensor data and second sensor data.

For example, the first vehicle pose and the second vehicle pose may be separated by a distance greater than a threshold distance. The threshold distance may be for example 10 m, or 50 m, or 100 m.

In some examples, the first sensor data may be associated with a first time, the second sensor data may be associated with a second time, and the second time may be at least a threshold time period after the first time. The threshold time period may be relatively short, for example 10 seconds, 1 minute, 5 minutes, etc., such that the vehicle has moved a significant distance down the road, yielding a different view of the environment. Alternatively, the threshold time period may be set such that the data are captured on different days, at different times of the day, or at different times of the year. For example, the threshold time period may be 1 day or more, or 1 week or more, or 1 month or more.

In some examples the first sensor data may be associated with a different sensor system than the second sensor data. For example, the first sensor data may be captured by a first sensor system of a vehicle, and the second sensor data may be captured by second sensor system of a vehicle. The second sensor system may be at a different position on the vehicle. For example, the first sensor system may look ahead of the vehicle, whereas the second sensor system may look behind the vehicle. The second sensor system may be of a different sensor type than the first sensor system. For example, the first sensor system may comprise a camera, and the second sensor system may comprise a lidar detector. Alternatively or additionally, the first sensor data may be associated with (e.g. be part of) a different vehicle than the second sensor data.

Returning to operation 504, in some examples the user may freely select a position associated with a landmark in the presented representation of the sensor data. In alternative examples, the system may identify one or more candidate landmarks. The user interface may present an indication of a suggested position associated with the candidate landmark. The user input may confirm or reject the suggested position and/or candidate landmark. For example, such an approach may be used where landmarks can be automatically identified, but with insufficient reliability of detection to be included in a predetermined set of landmarks (for which map data can be generated automatically as discussed in relation to process 300).

Alternatively or additionally, operation 504 may comprise verifying the user input. For example, operation 504 may comprise verifying that the user has a selected the same position and/or the same landmark as selected on previously presented sensor data. Verification may for example be based on object detection algorithms. Alternatively, verification may comprise tracing respective rays from the vehicle position when sensor data was recorded to the user-selected point, for each of multiple sets of sensor data. Verification may comprise determining that the rays would intersect at the same position in real space.

Process 500 may comprise operation 506. Operation 508 may comprise determining, based at least in part on the position associated with the landmark, the first vehicle pose, and the second vehicle pose, an alignment between the first sensor data and the second sensor data. Determining an alignment may comprise determining a link between the first vehicle pose and the second vehicle pose, based at least in part on the user-identified position as represented in the first sensor data and the second sensor data. The alignment may define the transformation(s) necessary to align the first sensor data with the second sensor data.

Process 500 may comprise operation 508. Operation 508 may comprise determining map data based at least in part on the first sensor data, the second sensor data, and the alignment. For example, the map data may be or may comprise one or more factor graphs, such as factor graph 100.

Figure 6:
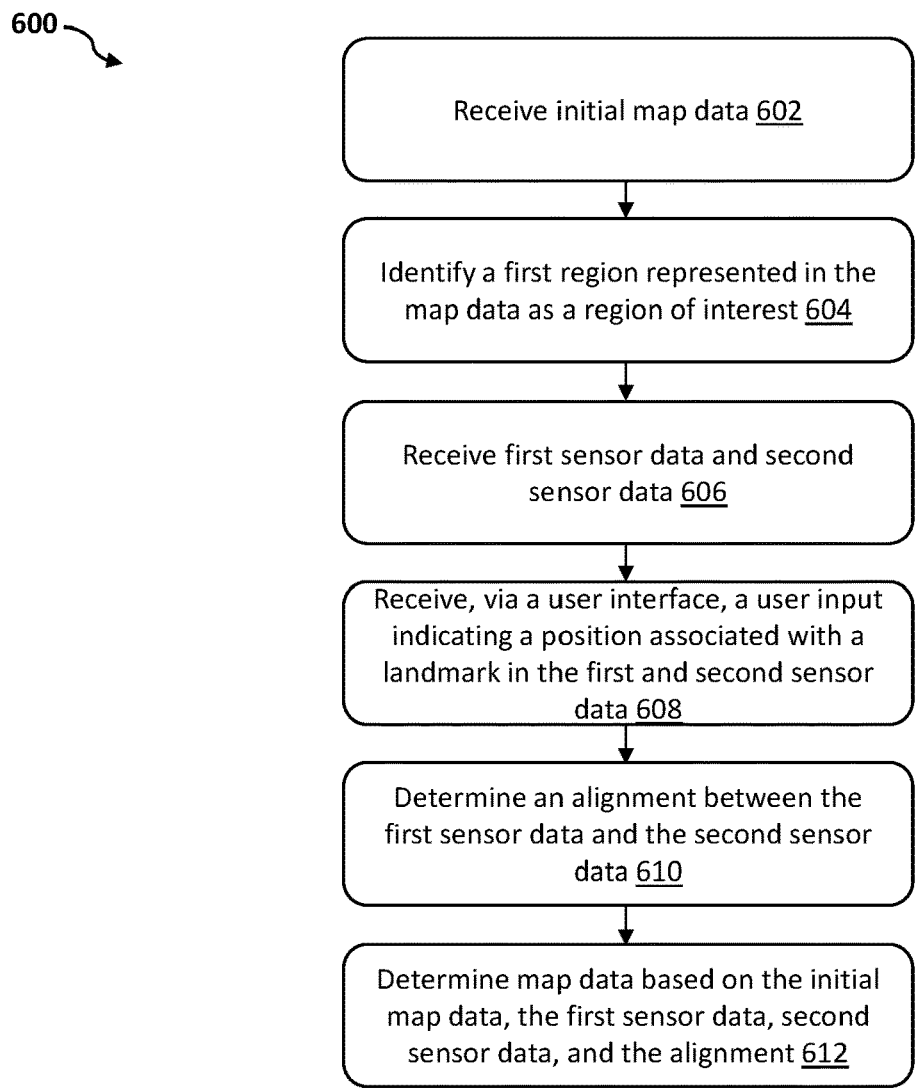
FIG. 6 schematically illustrates a further process according to techniques of the present disclosure.

FIG. 6 illustrates an alternative process 600. Process 600 may comprise operations 606-612, which may be substantially similar to operations 502-508 discussed above. In this case, however, prior to providing sensor data to the user interface, it is determined that a particular map region is a region of interest. Only sensor data associated with the region of interest may be provided to the user interface. Sensor data associated with other regions may be processed similarly to operations 302-306 described above. In this way, user input is only sought where needed. As well as reducing the burden on the user, such an approach may also reduce the computational burden. For example, such an approach may seek additional landmarks only where needed. In contrast, if additional landmarks were identified by the user even for regions with sufficient landmarks to provide accurate map data, there may be too many variables for the system to optimize against.

Process 600 may be implemented on a computer device, such as computer device(s) 734. Process 600 may be implemented on a system comprising one or more processors and one or more non-transitory computer-readable media storing instructions that, when executed, perform the operations of process 600. Process 600 may be implemented as one or more transitory or non-transitory computer-readable media storing instructions executable by one or more processors, wherein the instructions, when executed, cause the one or more processors to perform the operations of process 600. Process 600 may be implemented as a computer program comprising instructions which, when executed by a computer device, cause the computer device to perform the operations of process 600.

Process 600 may comprise operation 602. Operation 602 may comprise receiving initial map data. Initial map data may comprise map data generated without user selection of landmarks, for example generated using the techniques of operations 302-306 described above. Initial map data may be received from a memory, such as a memory associated with the computer device implementing operation 600.

Process 600 may comprise operation 604. Operation 604 may comprise identifying a first region represented in the initial map data as a region of interest. Some examples may comprise determining a confidence metric associated with the first region. For example, the confidence metric may indicate a confidence in accuracy of the map data. If the confidence metric for the first region is below a threshold confidence (e.g., confidence in accuracy is low), the first region may be identified as a region of interest. The confidence metric may for example be based at least in part on an error or residual derived from an optimization algorithm performed on the factor graph of poses connected by alignments, as discussed above. The confidence metric may be based at least in part on a number of constraints associated with one or more poses of the factor graph. That is, the more landmarks recognized in the respective sets of sensor data, the more constraints there are on factor graph. Fewer constraints (e.g., below a predetermined number of constraints per pose node) may be associated with a lower confidence in the accuracy of the aligned poses.

If a first region is identified as a region of interest, sensor data associated with the first region may be processed according to operations 606-612 to generate updated map data. The updated map data may be based on the initial map data, the first sensor data, second sensor data, and alignment between the first sensor data and second sensor data. For example, the first and second sensor data may be added to the factor graph(s) associated with the initial map data. A confidence metric may be determined for the updated map data. If the confidence metric remains below the threshold confidence, operations 606-612 may be repeated to receive further identifications of landmarks from the user.

Figure 7:
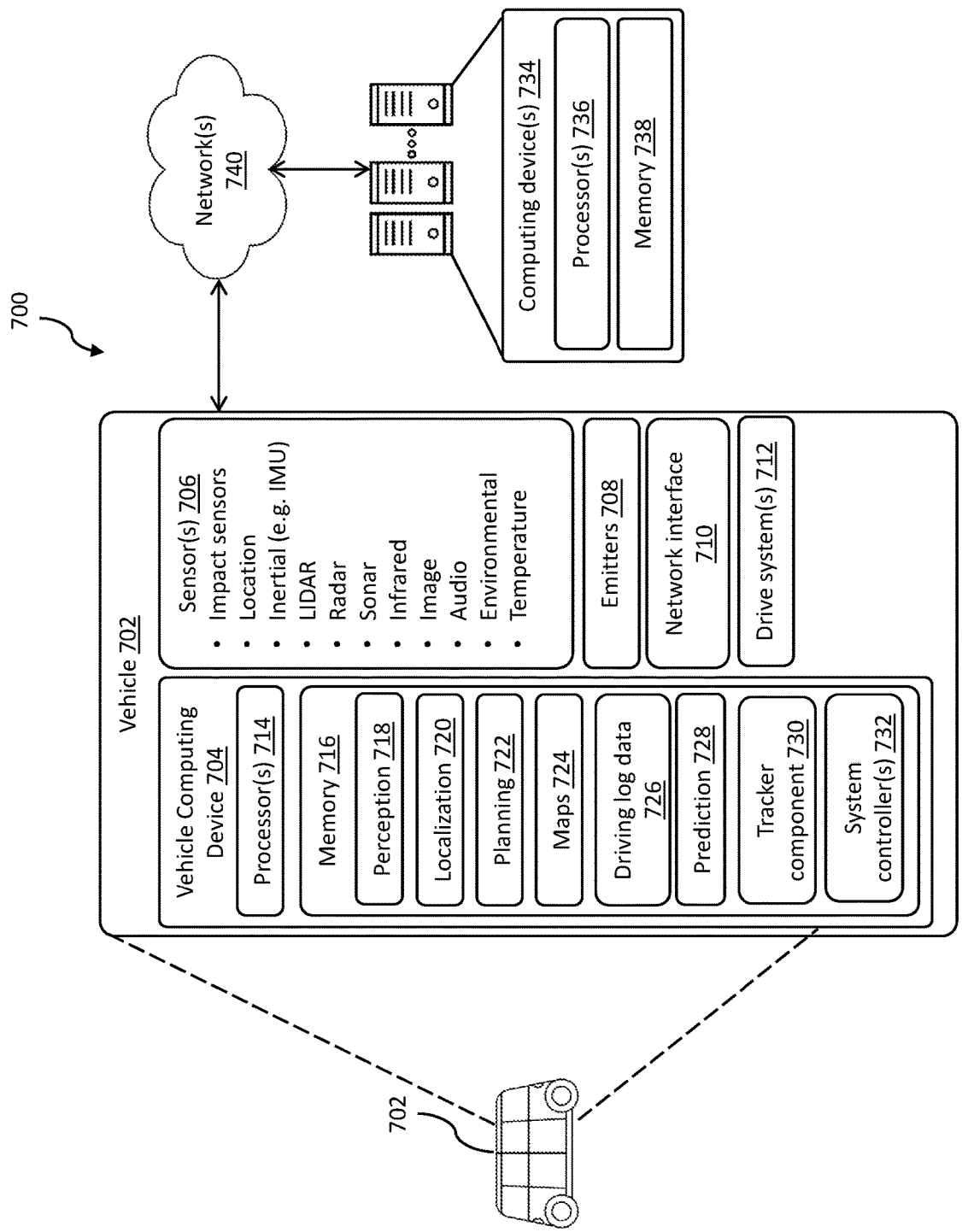
FIG. 7 is a block diagram of an example system for implementing the techniques discussed herein.

FIG. 7 illustrates a block diagram of an example system 700 that may implement the techniques discussed herein. In some instances, the example system 700 may include a vehicle 702. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well. The one or more vehicles 106 illustrated in FIG. 1 may be examples of vehicles 702.

The vehicle 702 may include a vehicle computing device(s) 704, sensor(s) 706, emitter(s) 708, network interface(s) 710, and/or drive system(s) 712. Sensor(s) 706 may represent sensor(s) 112. The system 700 may additionally or alternatively comprise computing device(s) 734.

In some instances, the sensor(s) 706 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 706 may include multiple instances of each of these or other types of sensors. For instance, the radar sensors may include individual radar sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704 and/or to computing device(s) 734. The sensor system 104 described above in relation to FIG. 1 may be or comprise one or more sensor 706.

The vehicle 702 may also include emitter(s) 708 for emitting light and/or sound, as described above. The emitter(s) 708 may include interior audio and visual emitter(s) to communicate with passengers of the vehicle 702. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include network interface(s) 710 that enable communication between the vehicle 702 and one or more other local or remote computing device(s). The network interface(s) 710 may facilitate communication with other local computing device(s) on the vehicle 702 and/or the drive component(s) 712. The network interface(s) 710 may additionally or alternatively allow the vehicle to communicate with other nearby computing device(s) (e.g., other nearby vehicles, traffic signals, etc.). The network interface(s) 710 may additionally or alternatively enable the vehicle 702 to communicate with computing device(s) 734 over a network 740. In some examples, computing device(s) 734 may comprise one or more nodes of a distributed computing system (e.g., a cloud computing architecture).

The vehicle 702 may include one or more drive components 712. In some instances, the vehicle 702 may have a single drive component 712. In some instances, the drive component(s) 712 may include one or more sensors to detect conditions of the drive component(s) 712 and/or the surroundings of the vehicle 702. By way of example and not limitation, the sensor(s) of the drive component(s) 712 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 712. In some cases, the sensor(s) on the drive component(s) 712 may overlap or supplement corresponding systems of the vehicle 702 (e.g., sensor(s) 706).

The drive component(s) 712 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 712 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 712. Furthermore, the drive component(s) 712 may also include one or more communication connection(s) that enable communication by the respective drive component with one or more other local or remote computing device(s).

The vehicle computing device(s) 704 may include processor(s) 714 and memory 716 communicatively coupled with the one or more processors 714. Computing device(s) 734 may also include processor(s) 736, and/or memory 738. The processor(s) 714 and/or 736 may be any suitable processor capable of executing instructions to process data and perform operations as described herein. By way of example and not limitation, the processor(s) 714 and/or 736 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 716 and/or 738 may be examples of non-transitory computer-readable media. The memory 716 and/or 738 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 716 and/or memory 738 may store a perception component 718, localization component 720, planning component 722, map(s) 724, driving log data 726, prediction component 728, tracker component and/or system controller(s) 732—zero or more portions of any of which may be hardware, such as GPU(s), CPU(s), and/or other processing units.

The perception component 718 may detect object(s) in in an environment surrounding the vehicle 702 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 718 is referred to as perception data. The perception component 718 may be configured to associate a bounding region (or other indication) with an identified object. The perception component 718 may be configured to associate a confidence score associated with a classification of the identified object with an identified object. In some examples, objects, when rendered via a display, can be colored based on their perceived class. The object classifications determined by the perception component 718 may distinguish between different object types such as, for example, a passenger vehicle, a pedestrian, a bicyclist, motorist, a delivery truck, a semi-truck, traffic signage, and/or the like.

In at least one example, the localization component 720 may include hardware and/or software to receive data from the sensor(s) 706 to determine a position, velocity, and/or orientation of the vehicle 702 (e.g., one or more of an x-, y-, z-position, roll, pitch, or yaw). For example, the localization component 720 may include and/or request/receive map(s) 724 of an environment and can continuously determine a location, velocity, and/or orientation of the autonomous vehicle 702 within the map(s) 724. In some instances, the localization component 720 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 720 may provide data to various components of the vehicle 702 to determine an initial position of an autonomous vehicle for generating a trajectory and/or for generating map data, as discussed herein. In some examples, localization component 720 may provide, to the perception component 718, a location and/or orientation of the vehicle 702 relative to the environment and/or sensor data associated therewith.

The planning component 722 may receive a location and/or orientation of the vehicle 702 from the localization component 720 and/or perception data from the perception component 718 and may determine instructions for controlling operation of the vehicle 702 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 732 and/or drive component(s) 712 may parse/cause to be carried out, second instructions for the emitter(s) 708 may be formatted according to a second format associated therewith).

The driving log data 726 may comprise sensor data, perception data, and/or scenario labels collected/determined by the vehicle 702 (e.g., by the perception component 718), as well as any other message generated and or sent by the vehicle 702 during operation including, but not limited to, control messages, error messages, etc. In some examples, the vehicle 702 may transmit the driving log data 726 to the computing device(s) 734. The computing device(s) 734 may identify one or more scenarios based at least in part on the log data, which may also comprise defining a scenario, wherein the scenarios are used to generate a playback simulation. For example, the computing device(s) 734 may determine an environmental layout, a number, type, and a configuration of object(s) in the environment and/or associate this definition with one or more portions of log data associated with that scenario. In some examples, the driving log data 726 may comprise (historical) perception data that was generated on the vehicle 702 during operation of the vehicle.

The prediction component 728 may generate one or more probability maps representing prediction probabilities of possible locations of one or more objects in an environment. For example, the prediction component 728 may generate one or more probability maps for vehicles, pedestrians, animals, and the like within a threshold distance from the vehicle 702. In some examples, the prediction component 728 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planning component 722 may be communicatively coupled to the prediction component 728 to generate predicted trajectories of objects in an environment. For example, the prediction component 728 may generate one or more predicted trajectories for objects within a threshold distance from the vehicle 702. In some examples, the prediction component 728 may measure a trace of an object and generate a trajectory for the object based on observed and predicted behavior. Although prediction component 728 is shown on a vehicle 702 in this example, the prediction component 728 may also be provided elsewhere, such as in a remote computing device as shown in FIG. 7. In some embodiments, a prediction component may be provided at both a vehicle and a remote computing device. These components may be configured to operate according to the same or a similar algorithm.

The memory 716 and/or 738 may additionally or alternatively store a mapping system, a planning system, a ride management system, etc. Although perception component 718 and/or planning component 722 are illustrated as being stored in memory 716, perception component 718 and/or planning component 722 may include processor-executable instructions, machine-learned model(s) (e.g., a neural network), and/or hardware.

As described herein, the localization component 720, the perception component 718, the planning component 722, the prediction component 728, and/or other components of the system 700 may comprise one or more ML models. For example, the localization component 720, the perception component 718, the planning component 722, and/or the planning component 728 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 720 may additionally or alternatively store one or more system controller(s) 732, which may be configured to control steering, propulsion, braking, safety, emitters, communication, and other systems of the vehicle 702. These system controller(s) 732 may communicate with and/or control corresponding systems of the drive component(s) 712 and/or other components of the vehicle 702.

It should be noted that while FIG. 7 is illustrated as a distributed system, in alternative examples, components of the vehicle 702 may be associated with the computing device(s) 734 and/or components of the computing device(s) 734 may be associated with the vehicle 702. That is, the vehicle 702 may perform one or more of the functions associated with the computing device(s) 734, and vice versa.

EXAMPLE CLAUSES

A: A system comprising one or more processors; and one or more non-transitory computer-readable media storing instructions that, when executed, cause the system to perform operations comprising: receiving first sensor data associated with a first vehicle pose and second sensor data associated with a second vehicle pose; identifying a first landmark in the first sensor data and in the second sensor data; determining, based at least in part on the first landmark, the first vehicle pose, and the second vehicle pose, a first alignment between the first sensor data and the second sensor data; providing based at least in part on the first alignment between the first sensor data and the second sensor data representations of the first sensor data and the second senor data to a user interface; receiving, via the user interface, user input indicating a position associated with a user-selected feature represented in the first sensor data and in the second sensor data; determining, based at least in part on the position associated with the user-selected feature, the first vehicle pose, and the second vehicle pose, a second alignment between the first sensor data and the second sensor data; determining map data based at least in part on the first sensor data, the second sensor data, and the second alignment between the first sensor data and the second sensor data; and transmitting the map data to a vehicle configured to be controlled based at least in part on the map data.

B: The system of clause B, the operations further comprising: determining a confidence associated with the first vehicle pose or the second vehicle pose based at least in part on the first alignment between the first sensor data and the second sensor data; and comparing the confidence associated with the first vehicle pose or the second vehicle pose to a confidence threshold, wherein providing the first sensor data and the second sensor data to a user interface is based at least in part on the comparing the confidence associated with the first vehicle pose or the second vehicle pose to the confidence threshold.

C: The system of clause A or clause B, the operations comprising: determining, based at least in part on the user input, an uncertainty associated with the position associated with the user-selected feature; and determining the map data based at least in part on the uncertainty.

D: The system of clause C, the operations comprising: displaying, on the user interface, an indication of the uncertainty; receiving, via the user interface, a further user input indicating the position associated with the user-selected feature; and updating the uncertainty associated with the position associated with the second landmark.

E: The system of any preceding clause, the operations comprising: receiving a first user input on the representation of the first sensor data, the first user input indicating the position of the user-selected feature in the representation of the first sensor data; receiving a second user input on the representation of the second sensor data, the second user input indicating the position of the user-selected feature in the representation of the first sensor data; and determining the second alignment between the first sensor data based at least in part on the first user input and the second user input.

F: A method comprising: receiving first sensor data associated with a first vehicle pose and second sensor data associated with a second vehicle pose; receiving, via a user interface, a user input indicating a position associated with a feature represented in the first sensor data and the second sensor data; determining, based at least in part on the position associated with the feature, the first vehicle pose, and the second vehicle pose, an alignment between the first sensor data and the second sensor data; and determining map data based at least in part on the first sensor data, the second sensor data, and the alignment.

G: The method of clause F, wherein the first vehicle pose and the second vehicle pose are separated by a distance greater than a threshold distance.

H: The method of clause F or clause G, wherein the first sensor data is associated with a first time, the second sensor data is associated with a second time, and wherein the second time is at least a threshold time period after the first time.

I: The method of any of clauses F to H, wherein the first sensor data is associated with a different sensor system than the second sensor data.

J: The method of any of clauses F to I, wherein the first sensor data is associated with a different vehicle than the second sensor data.

K: The method of any of clauses F to J, comprising: receiving initial map data; determining that a confidence metric associated with a first region represented in the map data is below a threshold confidence, the first and second sensor data associated with the first region; and presenting the first and second sensor data on the user interface based at least in part on determining that the confidence metric is below the threshold confidence.

L: The method of any of clauses F to K, comprising: receiving a first user input indicating a first position of the feature in a two-dimensional representation of the first sensor data; determining a first ray in three-dimensional space associated with the first position; receiving a second user input indicating a second position of the feature in a two-dimensional representation of the second sensor data; determining a second ray in three-dimensional space associated with the second position; determining a third position in three-dimensional space based at least in part on a first distance from the third position to the first ray and on a second distance from the third position to the second ray; and identifying the third position as the position of the feature.

M: The method of clause L, further comprising presenting a projection of the third position on the two-dimensional representation of the first sensor data or second sensor data.

N: The method of clause M, further comprising: determining an error associated with the third position; and presenting a representation of the error on the two-dimensional representation of the first sensor data or second sensor data.

O: The method of any of clauses F to N, wherein determining the alignment comprises perturbing the first vehicle pose or the second vehicle pose based at least in part on the position associated with the landmark.

P: The method of any of clauses F to O, further comprising: transmitting the map data to a vehicle configured to be controlled based at least in part on the map data.

Q: One or more non-transitory computer-readable media storing instructions executable by one or more processors, wherein the instructions, when executed, cause the one or more processors to perform operations comprising: receiving first sensor data associated with a first vehicle pose and second sensor data associated with a second vehicle pose; receiving, via a user interface, a user input indicating a position associated with a feature represented in the first sensor data and the second sensor data; determining, based at least in part on the position associated with the feature, the first vehicle pose, and the second vehicle pose, an alignment between the first sensor data and the second sensor data; and determining map data based at least in part on the first sensor data, the second sensor data, and the alignment.

R: The one or more non-transitory computer-readable media of clause Q, the operations comprising: presenting, on the user interface, a representation of the first sensor data and an indication of a suggested position or area represented in the first sensor data and the second sensor data.

S: The one or more non-transitory computer-readable media of clause Q or clause R, wherein the first sensor data or second sensor data comprise at least one of: camera data, radar data, or lidar data.

T: The one or more non-transitory computer-readable media of any of clauses Q to S, the operations further comprising: determining a confidence metric associated with the map data; determining that the confidence metric does not satisfy a confidence condition; and receiving the user input based at least in part on determining that the confidence metric does not satisfy the confidence condition.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing instructions that, when executed, cause the system to perform operations comprising:
      receiving first sensor data associated with a first vehicle pose and second sensor data associated with a second vehicle pose;
      identifying a first landmark in the first sensor data and in the second sensor data;
      determining, based at least in part on the first landmark, the first vehicle pose, and the second vehicle pose, a first alignment between the first sensor data and the second sensor data;
      providing, based at least in part on the first alignment between the first sensor data and the second sensor data, representations of the first sensor data and the second sensor data to a user interface;
      receiving, via the user interface, user input indicating a position associated with a user-selected feature represented in the first sensor data and in the second sensor data;
      determining, based at least in part on the position associated with the user-selected feature, the first vehicle pose, and the second vehicle pose, a second alignment between the first sensor data and the second sensor data;
      determining map data based at least in part on the first sensor data, the second sensor data, and the second alignment between the first sensor data and the second sensor data; and
      transmitting the map data to a vehicle configured to be controlled based at least in part on the map data.

2. The system of claim 1, the operations further comprising:
   determining a confidence associated with the first vehicle pose or the second vehicle pose based at least in part on the first alignment between the first sensor data and the second sensor data; and
   comparing the confidence associated with the first vehicle pose or the second vehicle pose to a confidence threshold,
   wherein providing the first sensor data and the second sensor data to a user interface is based at least in part on the comparing the confidence associated with the first vehicle pose or the second vehicle pose to the confidence threshold.

3. The system of claim 1, the operations comprising:
determining, based at least in part on the user input, an uncertainty associated with the position associated with the user-selected feature; and
determining the map data based at least in part on the uncertainty.

4. The system of claim 3, the operations comprising:
displaying, on the user interface, an indication of the uncertainty;
receiving, via the user interface, a further user input indicating the position associated with the user-selected feature; and
updating the uncertainty associated with the position.

5. The system of claim 1, the operations comprising:
receiving a first user input on the representation of the first sensor data, the first user input indicating the position of the user-selected feature in the representation of the first sensor data;
receiving a second user input on the representation of the second sensor data, the second user input indicating the position of the user-selected feature in the representation of the first sensor data; and
determining the second alignment between the first sensor data based at least in part on the first user input and the second user input.

6. A method comprising:
receiving first sensor data associated with a first vehicle pose and second sensor data associated with a second vehicle pose, the first vehicle pose and the second vehicle pose separated by a distance greater than a threshold distance;
receiving, via a user interface, a user input indicating a position associated with a feature represented in the first sensor data and the second sensor data;
determining, based at least in part on the position associated with the feature, the first vehicle pose, and the second vehicle pose, an alignment between the first sensor data and the second sensor data;
determining map data based at least in part on the first sensor data, the second sensor data, and the alignment; and
transmitting the map data to a vehicle configured to be controlled based at least in part on the map data.

7. The method of claim 6, wherein the first sensor data is associated with a first time, the second sensor data is associated with a second time, and wherein the second time is at least a threshold time period after the first time.

8. The method of claim 6, wherein the first sensor data is associated with a different sensor system than the second sensor data.

9. The method of claim 6, wherein the first sensor data is associated with a different vehicle than the second sensor data.

10. The method of claim 6, comprising:
receiving initial map data;
determining that a confidence metric associated with a first region represented in the map data is below a threshold confidence, the first and second sensor data associated with the first region; and
presenting the first and second sensor data on the user interface based at least in part on determining that the confidence metric is below the threshold confidence.

11. The method of claim 6, comprising:
receiving a first user input indicating a first position of the feature in a two-dimensional representation of the first sensor data;
determining a first ray in three-dimensional space associated with the first position;
receiving a second user input indicating a second position of the feature in a two-dimensional representation of the second sensor data;
determining a second ray in three-dimensional space associated with the second position;
determining a third position in three-dimensional space based at least in part on a first distance from the third position to the first ray and on a second distance from the third position to the second ray; and
identifying the third position as the position of the feature.

12. The method of claim 11, further comprising presenting a projection of the third position on the two-dimensional representation of the first sensor data or second sensor data.

13. The method of claim 12, further comprising:
determining an error associated with the third position; and
presenting a representation of the error on the two-dimensional representation of the first sensor data or second sensor data.

14. The method of claim 6, wherein determining the alignment comprises perturbing the first vehicle pose or the second vehicle pose based at least in part on the position associated with the feature.

15. One or more non-transitory computer-readable media storing instructions executable by one or more processors, wherein the instructions, when executed, cause the one or more processors to perform operations comprising:
receiving first sensor data associated with a first vehicle pose and second sensor data associated with a second vehicle pose, the first vehicle pose and the second vehicle pose separated by a distance greater than a threshold distance;
receiving, via a user interface, a user input indicating a position associated with a feature represented in the first sensor data and the second sensor data;
determining, based at least in part on the position associated with the feature, the first vehicle pose, and the second vehicle pose, an alignment between the first sensor data and the second sensor data;
determining map data based at least in part on the first sensor data, the second sensor data, and the alignment; and
transmitting the map data to a vehicle configured to be controlled based at least in part on the map data.

16. The one or more non-transitory computer-readable media of claim 15, the operations comprising:
presenting, on the user interface, a representation of the first sensor data and an indication of a suggested position or area represented in the first sensor data and the second sensor data.

17. The one or more non-transitory computer-readable media of claim 15, wherein the first sensor data or second sensor data comprise at least one of: camera data, radar data, or lidar data.

18. The one or more non-transitory computer-readable media of claim 15, the operations further comprising:
determining a confidence metric associated with the map data;
determining that the confidence metric does not satisfy a confidence condition; and receiving the user input based at least in part on determining that the confidence metric does not satisfy the confidence condition.

\* \* \* \* \*